(12) United States Patent
Kong et al.

(10) Patent No.: US 8,369,043 B2
(45) Date of Patent: Feb. 5, 2013

(54) HARD DISK DRIVE

(75) Inventors: Dae Wee Kong, Yongin-si (KR); Woo Sung Kim, Seoul (KR)

(73) Assignee: Seagate Technology International

( * ) Notice: Subject to any disclaimer, the term of this patent is extended or adjusted under 35 U.S.C. 154(b) by 273 days.

(21) Appl. No.: 12/615,489

(22) Filed: Nov. 10, 2009

(65) Prior Publication Data

US 2010/0118437 A1    May 13, 2010

(30) Foreign Application Priority Data

Nov. 10, 2008 (KR) ........................ 10-2008-0110751

(51) Int. Cl.
*G11B 33/08* (2006.01)
(52) U.S. Cl. ................................... 360/97.17
(58) Field of Classification Search ............... 360/97.02, 360/97.16, 97.17
See application file for complete search history.

(56) References Cited

U.S. PATENT DOCUMENTS

| | | | | |
|---|---|---|---|---|
| 4,594,626 A | * | 6/1986 | Frangesh | 360/97.02 |
| 5,995,323 A | * | 11/1999 | Jinbo et al. | 360/97.02 |
| 6,008,965 A | * | 12/1999 | Izumi et al. | 360/97.03 |
| 6,208,484 B1 | * | 3/2001 | Voights | 360/97.02 |
| 6,594,108 B2 | * | 7/2003 | Naganathan et al. | 360/97.02 |
| 7,002,774 B2 | | 2/2006 | Adams | |
| 7,130,150 B2 | | 10/2006 | Ng et al. | |
| 7,379,265 B2 | | 5/2008 | Wang et al. | |
| 2001/0017744 A1 | * | 8/2001 | Bae et al. | 360/97.02 |
| 2001/0028527 A1 | * | 10/2001 | Bae et al. | 360/97.02 |

FOREIGN PATENT DOCUMENTS

JP            08-129871            5/1996

* cited by examiner

*Primary Examiner* — David D Davis

(57) ABSTRACT

A hard disk drive includes a base on which at least one disk recording and storing data is provided, a filter provided in an area around a corner of the base with a predetermined air flow space interposed between the corner and the filter to collect contaminant particles in air flowing due to rotation of the disk, and an air exhaust prevention unit provided in an area of the air flow space to prevent the air input to the air flow space through an inlet portion between the filter and a first corner side wall connected to the corner from being exhausted through an outlet portion between the filter and a second corner side wall connected to the corner without passing through the filter. The hard disk drive is manufactured in a simple method without changing the media of the filter and a contaminant particle collection effect is improved.

25 Claims, 19 Drawing Sheets

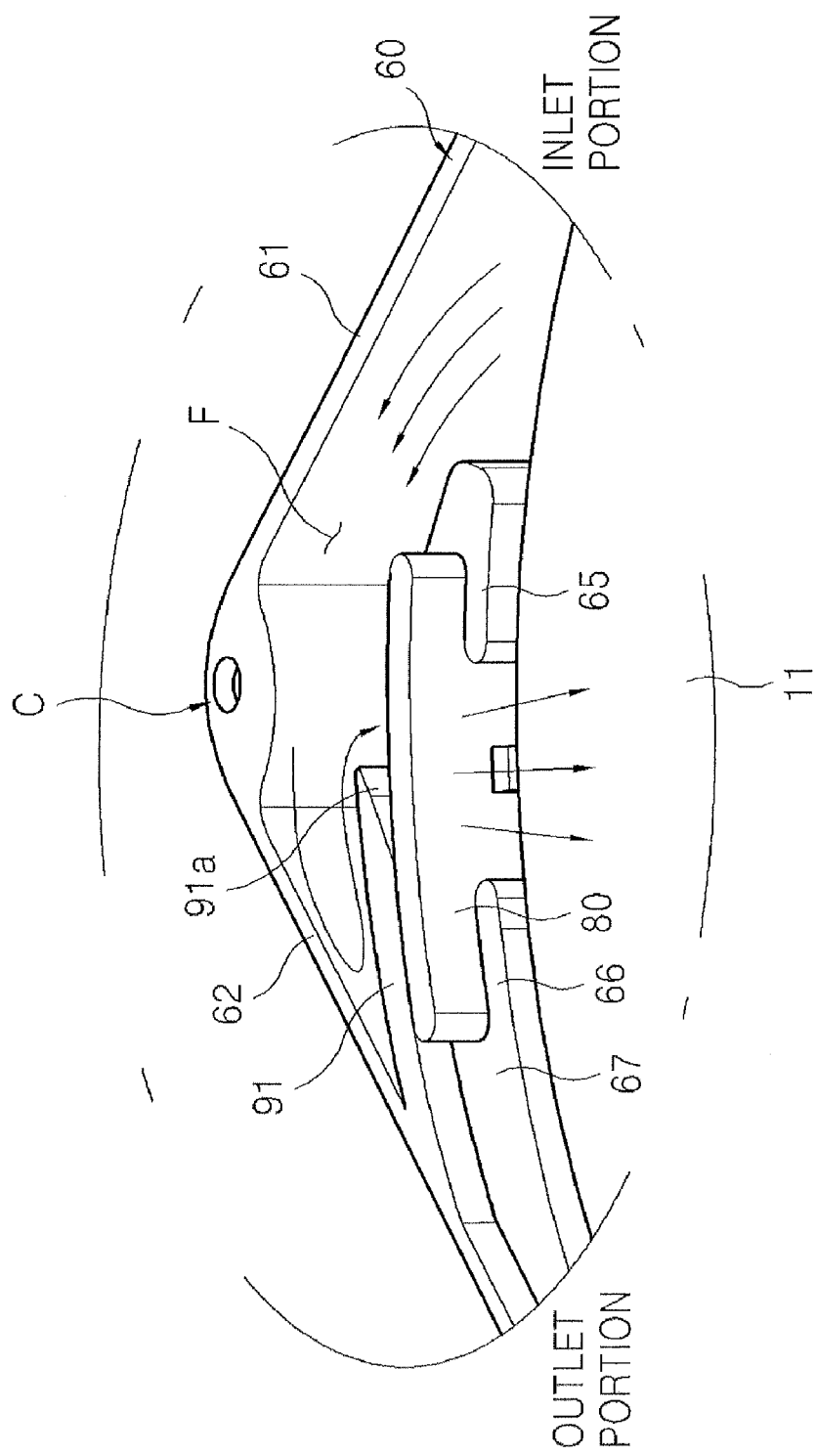

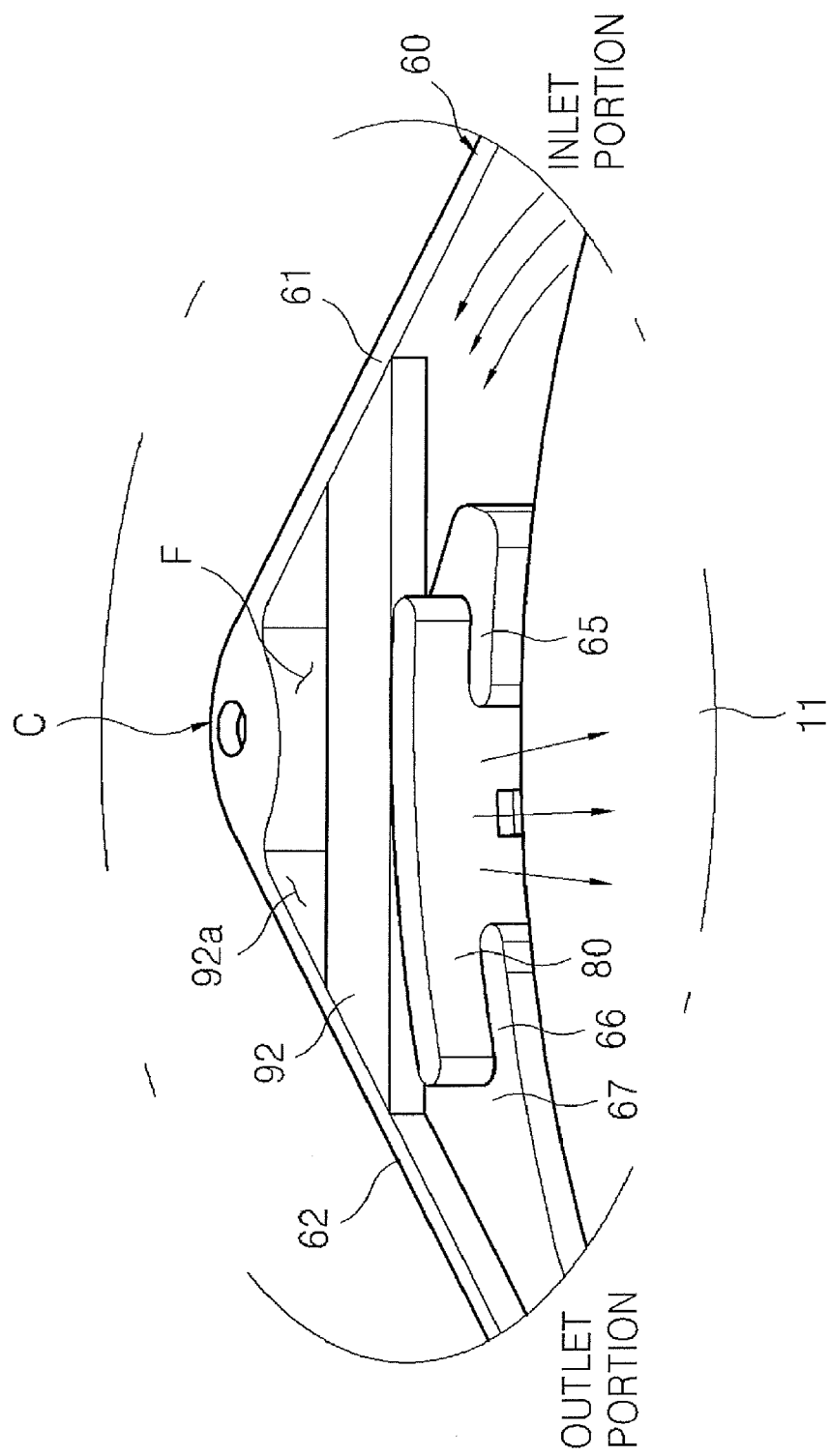

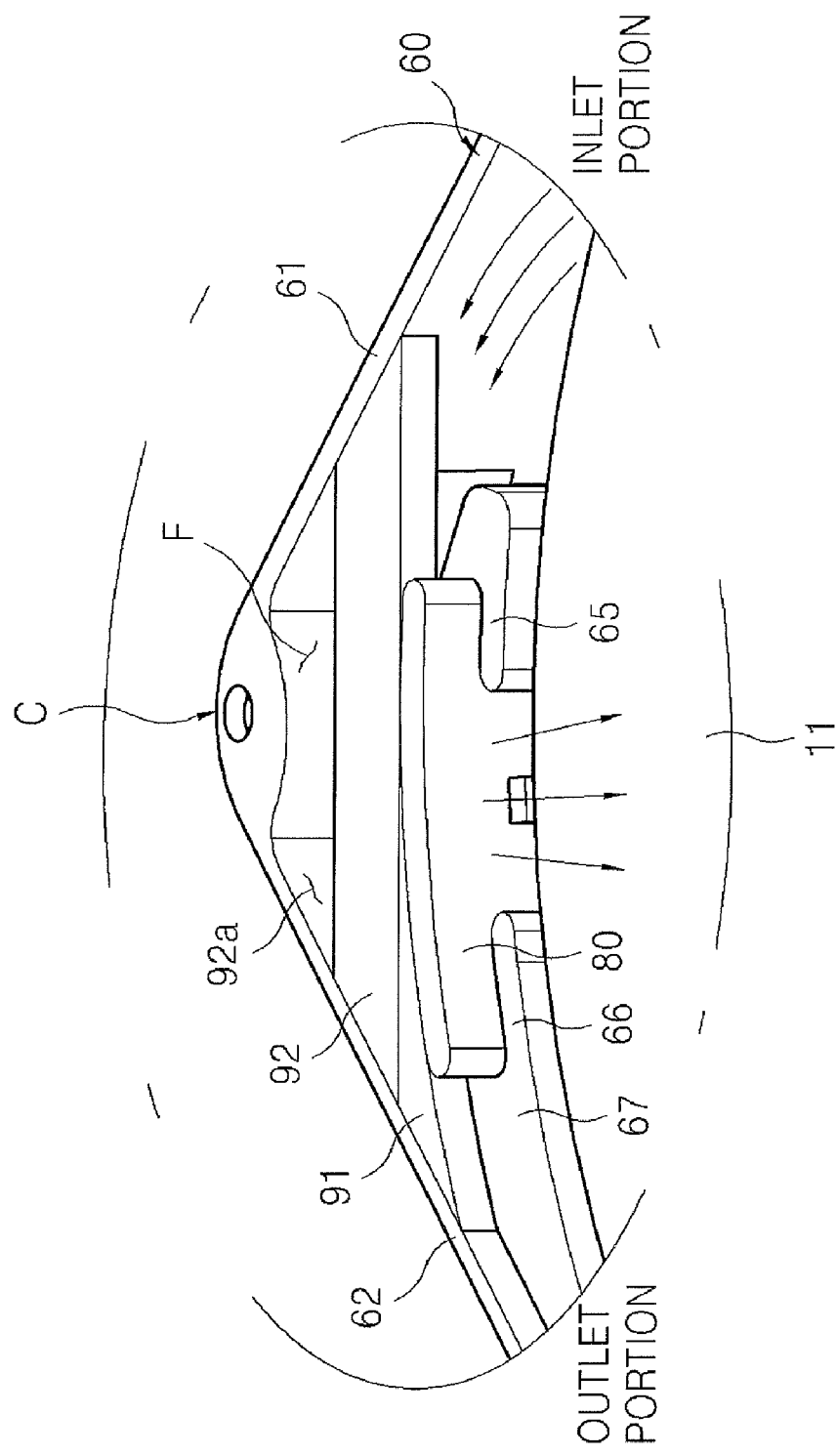

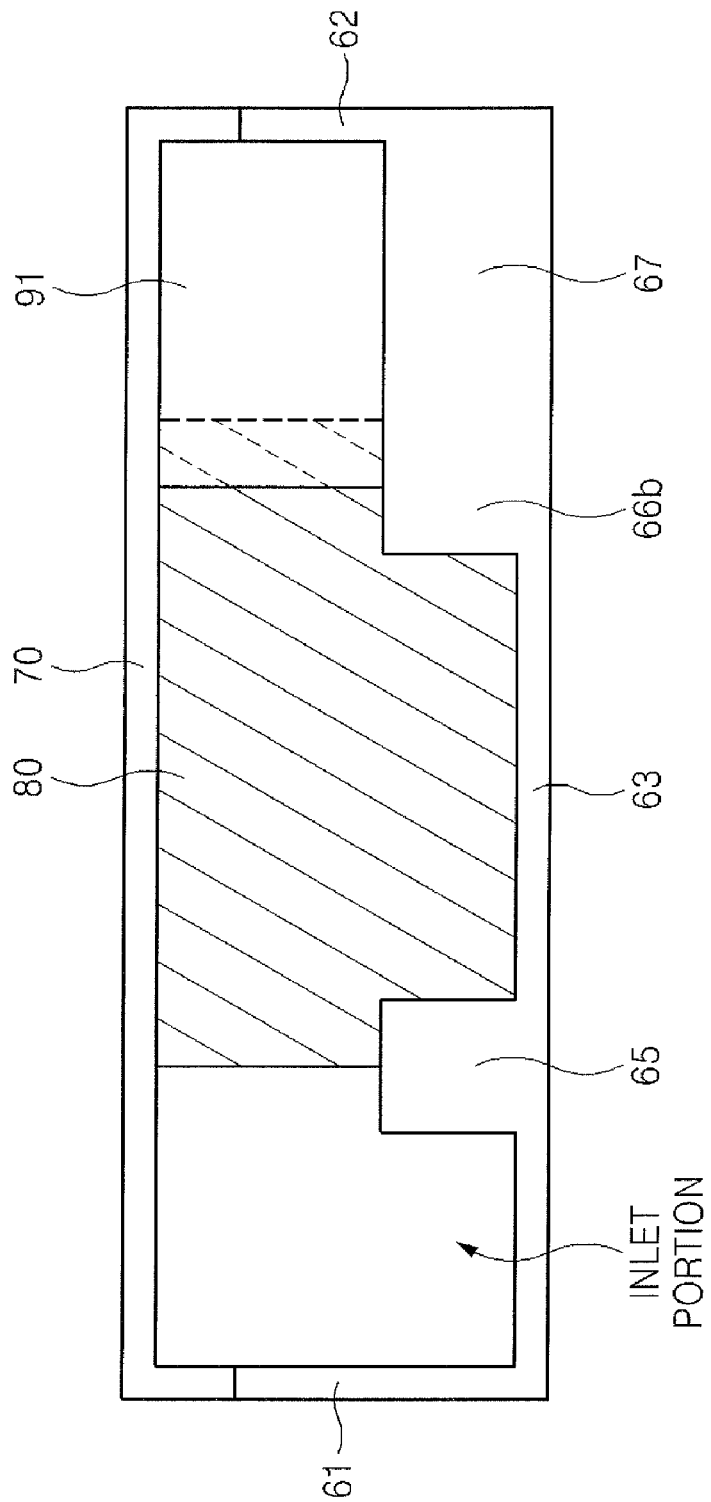

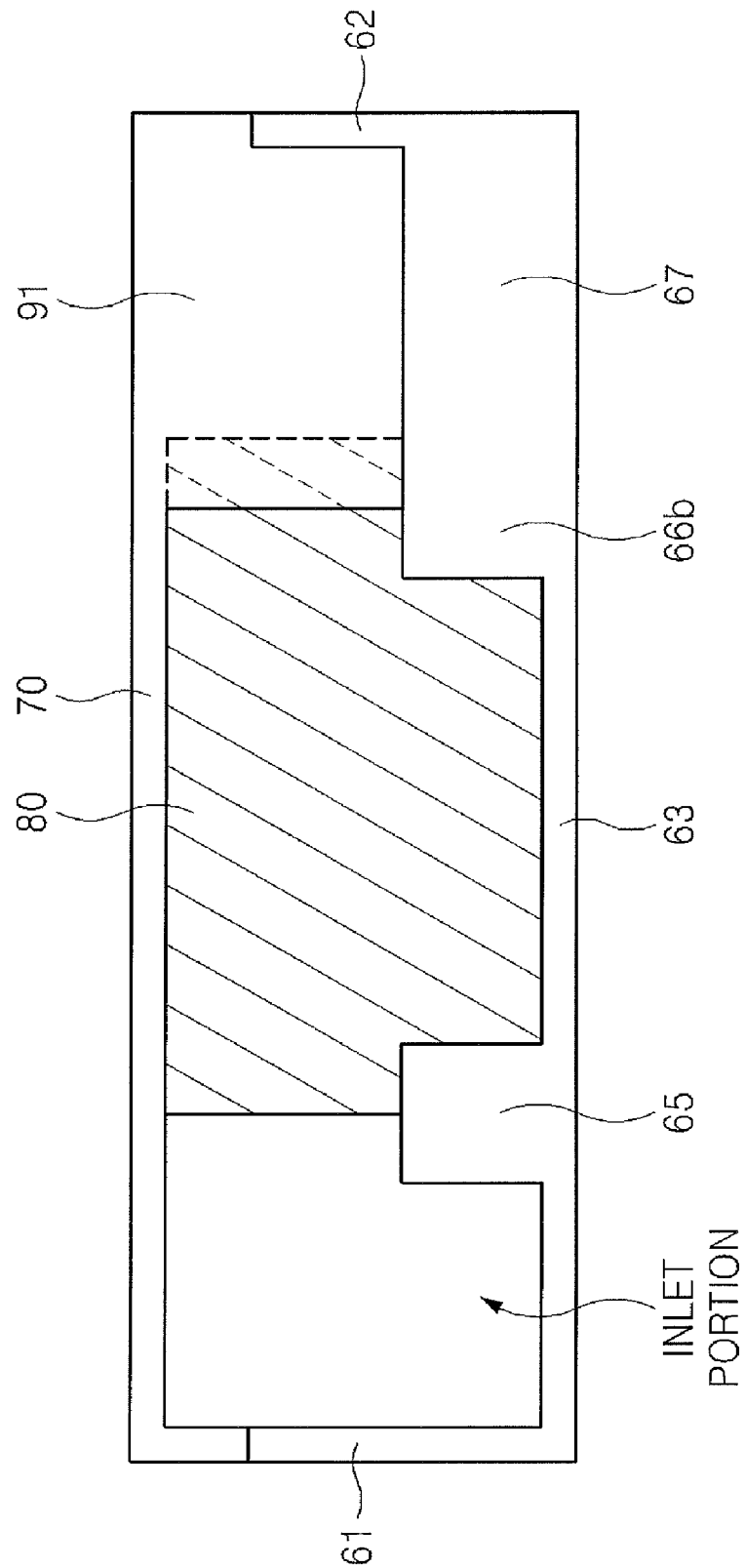

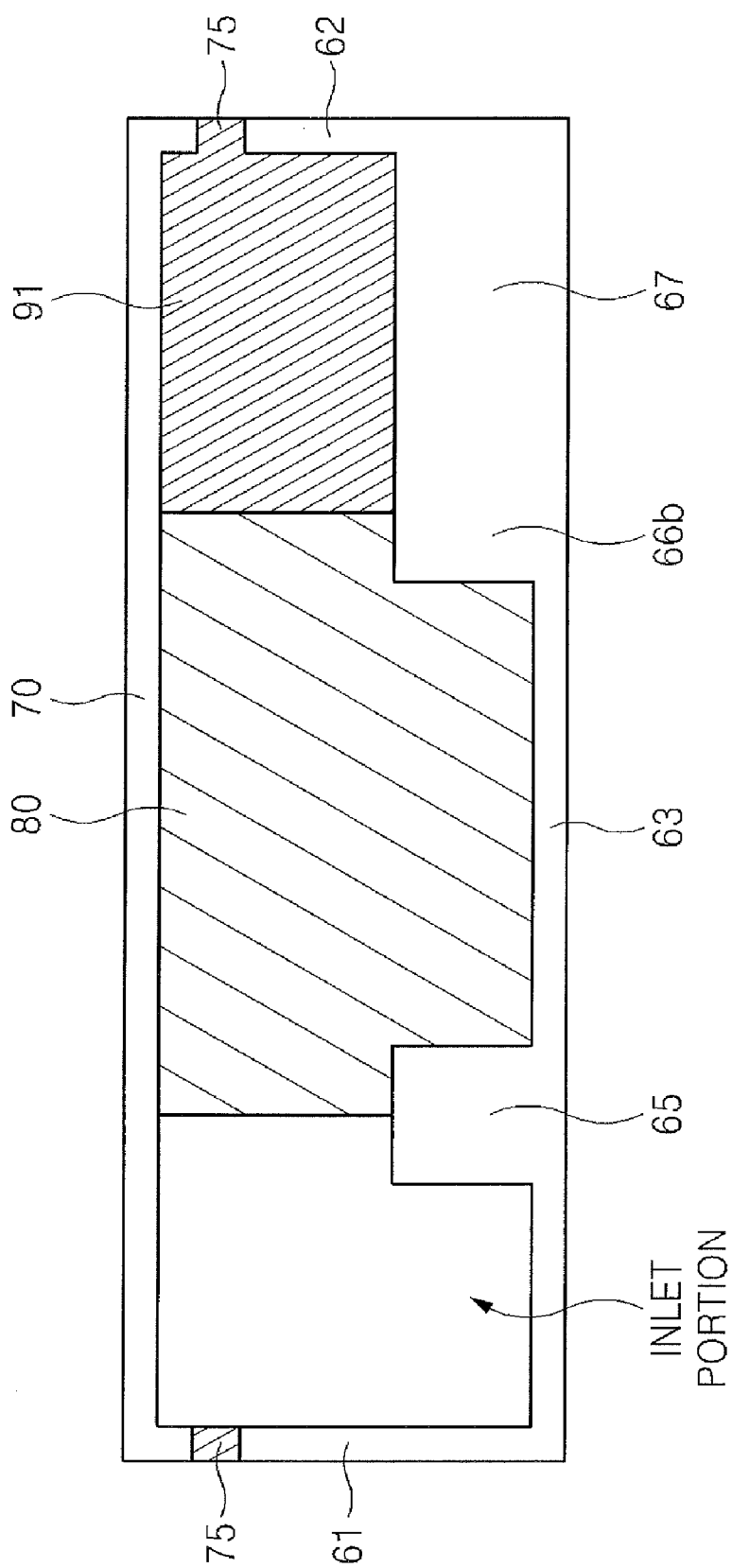

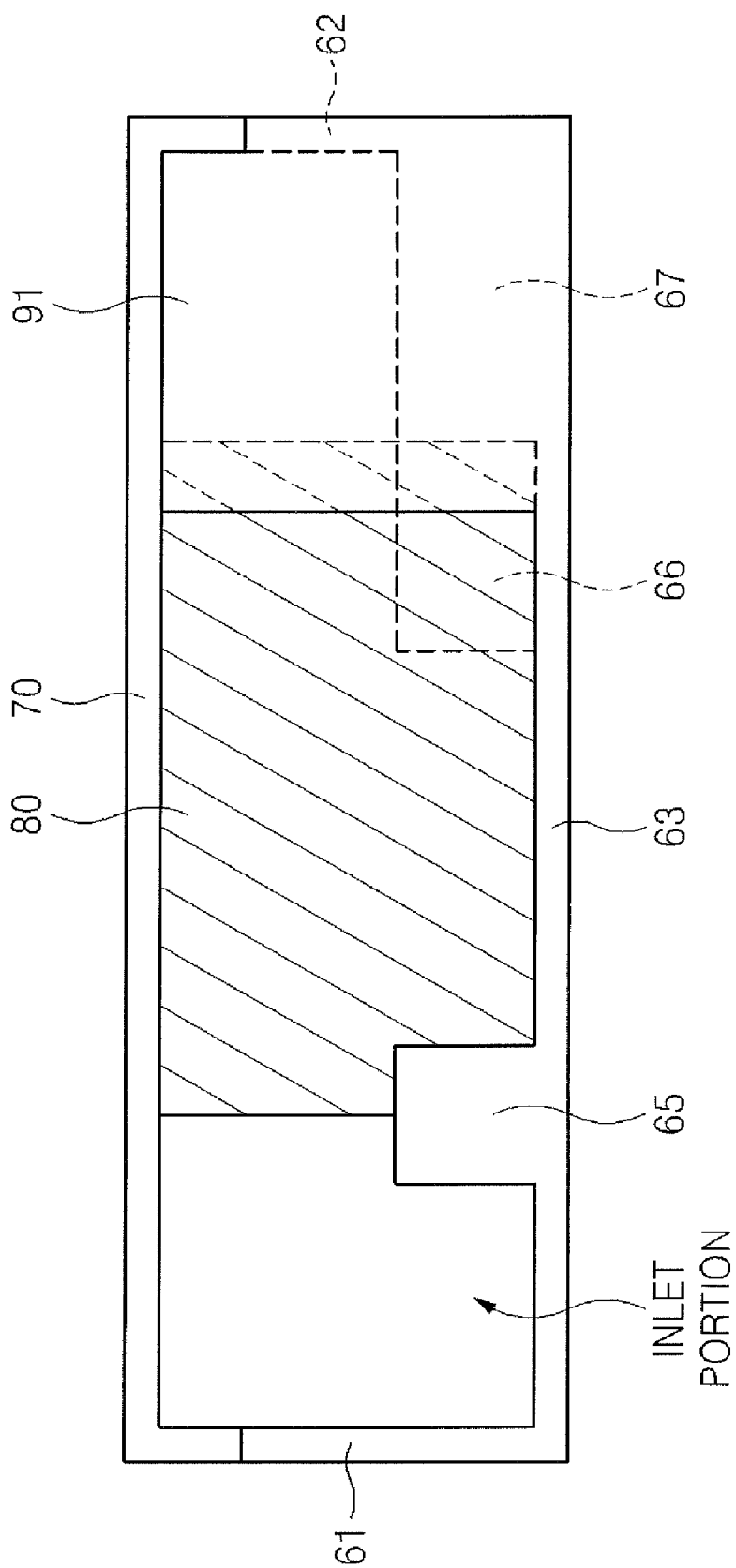

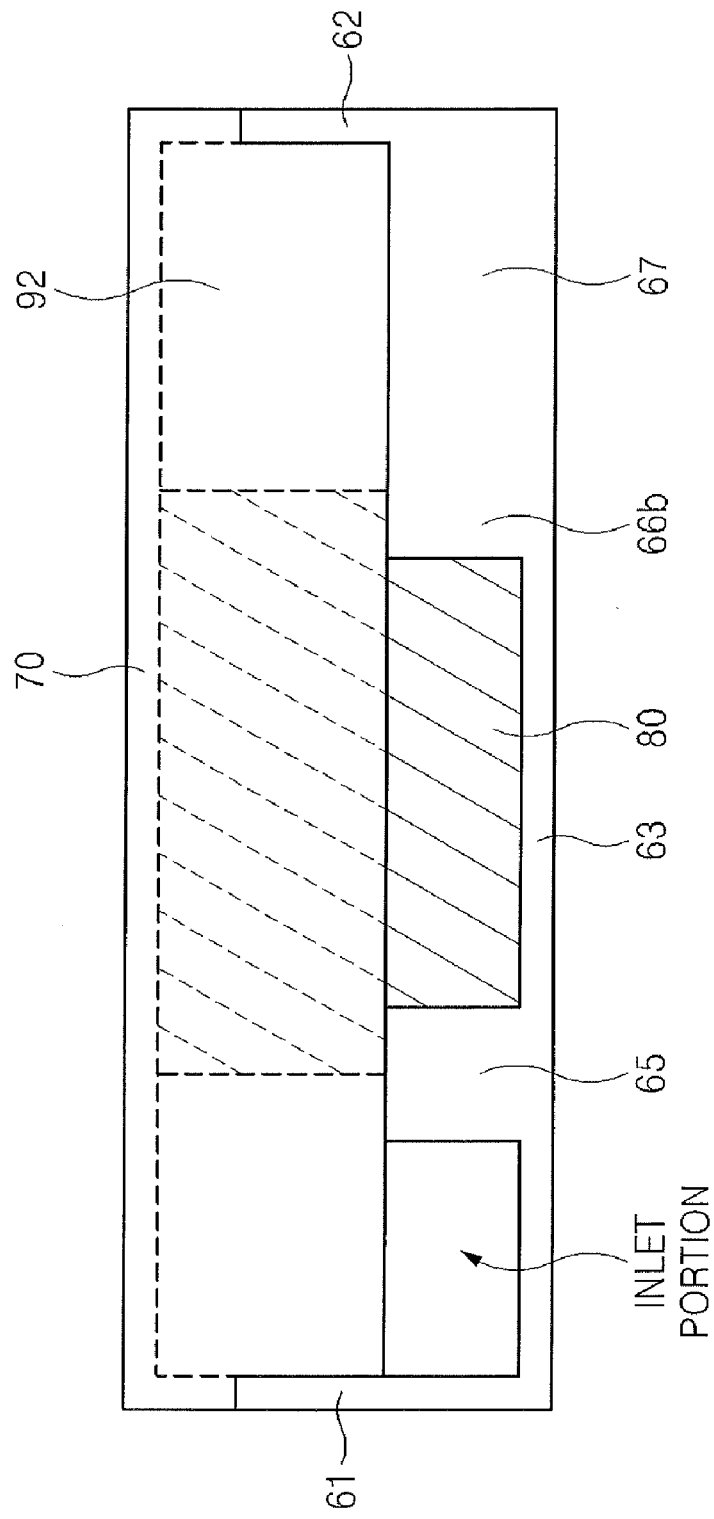

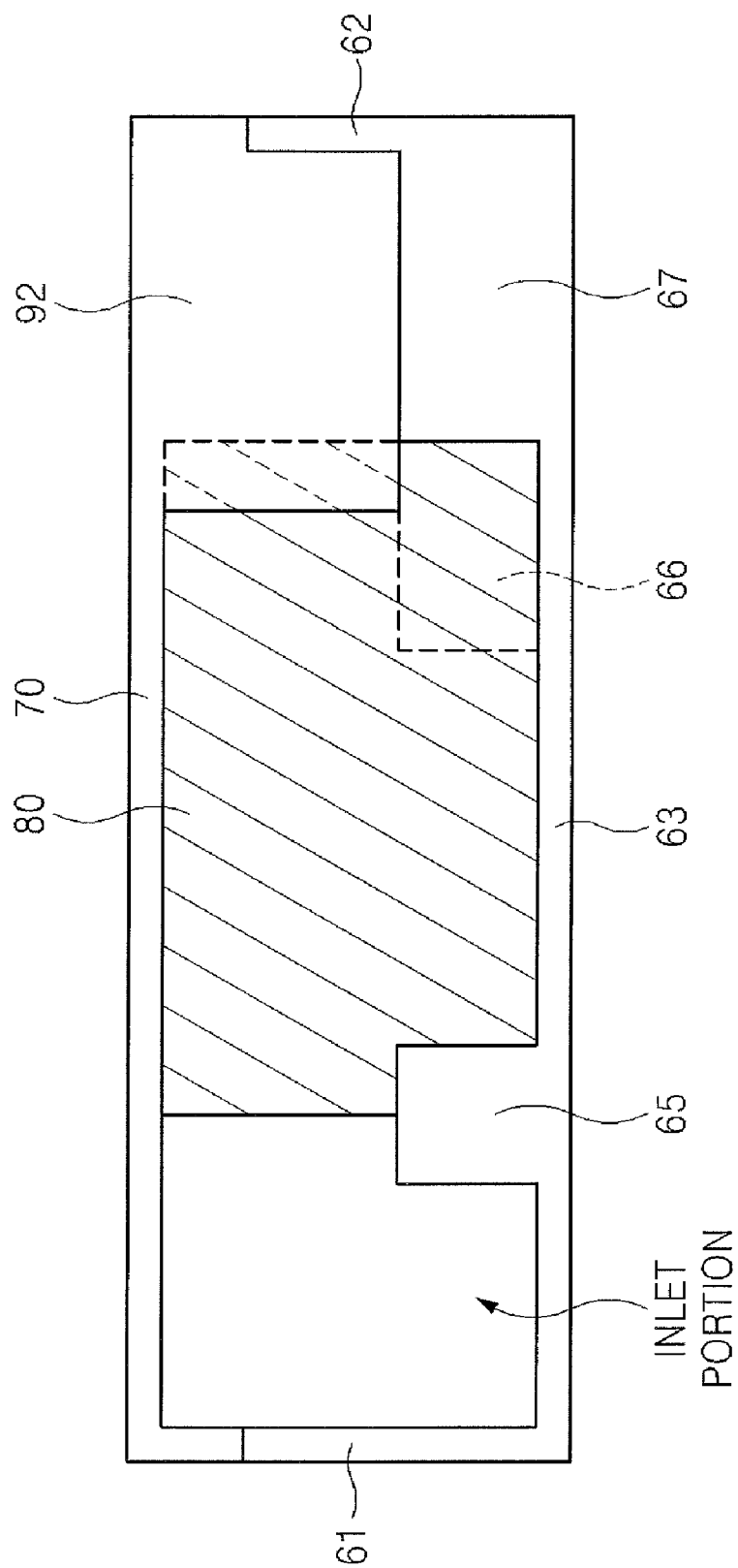

HARD DISK DRIVE

CROSS-REFERENCE TO RELATED APPLICATIONS

This application claims the priority of Korean Patent Application No. 10-2008-0110751, filed on Nov. 10, 2008, in the Korean Intellectual Property Office, the disclosure of which is incorporated herein by reference in its entirety.

BACKGROUND

1. Field of the Invention

The general inventive concept relates to a hard disk drive, and more particularly, to a hard disk drive is manufactured in a simple method without changing the material of a filter and has an improved contaminant particle collection effect.

2. Description of the Related Art

Hard disk drives (HDDs) are widely used as one of auxiliary memory devices of a computer system. A hard disk drive may be provided with a filter to capture particles. The filter may be arranged in the hard disk drive at a corner opposite a head stack assembly (HSA) with an air flow space therebetween. The filter collects contaminant particles in the air flowing due to rotation of a disk.

In the air flow in a filter area, air flows from an inlet portion formed between the filter and a first corner side wall connected to the corner toward an outlet portion formed between the filter and a second corner side wall connected to the corner. The difference in pressure between the inlet portion and the outlet portion may be related to the amount of air flowing from the inlet portion toward the outlet portion, which may be expressed by a predetermined performance curve. As more air flows through the filter, more particles may be collected. Thus, as the amount of air flowing from the inlet portion toward the outlet portion is increased, an improved contaminant particle collection effect may be expected.

The amount of air flowing from the inlet portion toward the outlet portion of the filter may be increased by changing the filter to a media having a high permeability or increasing the surface area of the filter. However, efficiency is deteriorated in the former while costs increase in the latter.

In a conventional HDD, however, the air input through the inlet portion of the filter during rotation of a disk does not pass through the filter but is exhausted through the outlet portion, or the air may flow along the side surface of the filter having a certain resistance. Therefore, there is a demand to improve the contaminant particle collection effect.

SUMMARY

The general inventive concept provides a hard disk drive that is manufactured in a simple method without changing the media of a filter and has an improved contaminant particle collection effect.

Additional aspects and utilities of the present general inventive concept will be set forth in part in the description which follows and, in part, will be obvious from the description, or may be learned by practice of the general inventive concept.

Features and/or utilities of the present general inventive concept may be realized by a hard disk drive including a base on which at least one disk recording and storing data is provided, a filter provided in an area around a corner of the base with a predetermined air flow space interposed between the corner and the filter to collect contaminant particles in air flowing due to rotation of the disk, and an air exhaust prevention unit provided in an area of the air flow space to prevent the air input to the air flow space through an inlet portion between the filter and a first corner side wall connected to the corner from being exhausted through an outlet portion between the filter and a second corner side wall connected to the corner without passing through the filter.

The air exhaust prevention unit may be a side surface rib that extends from the second corner side wall in a lengthwise direction of the filter.

The side surface rib may be provided on the base such that an upper surface of the side surface rib contacts an inner surface of the cover during assembly of the base and the cover.

A guide inclined surface to guide the air may be formed at a leading end portion of the side surface rib.

The air exhaust prevention unit may be an upper surface rib that is provided at a position separated from a bottom of the base toward the cover with both ends of the air exhaust prevention unit connected to the first and second corner side walls, and the upper surface rib may be provided at the base such that an upper surface of the upper surface rib contacts an inner surface of the cover during assembly of the base and the cover.

An aperture may be further formed between the upper surface rib and the corner of the base.

The air exhaust prevention unit may include a side surface rib extending from the second corner side wall in a lengthwise direction of the filter, and an upper surface rib provided at a position separated from a bottom of the base toward the cover with both ends of the air exhaust prevention unit connected to the first and second corner side walls.

The side surface rib may be arranged between the filter and the upper surface rib.

The hard disk drive may further include a filter holder that is coupled to the base to be separated from the first corner side wall and in which the filter is partially inserted, wherein the air exhaust prevention unit is an extended portion of the filter extending such that an upper surface of the air exhaust prevention unit contacts an inner surface of the cover during assembly of the base and the cover and one end portion of the filter inserted in the filter holder while the other end portion contacts the second corner side wall.

The hard disk drive may further include a cover covering an upper portion of the base, and a gasket contacting and performing a seal between the base and the cover, wherein the air exhaust prevention unit extends from at least one of the base, the cover, and the gasket.

Additional features and/or utilities of the present general inventive concept may be realized by a hard disk drive including a base, first and second side walls extending perpendicularly from the base to form a corner with the base and each other, a cover to contact the first and second side walls and to enclose the hard disk drive, a filter positioned on the base to allow air to flow toward the corner between the first side wall and the filter, and a blocking projection to prevent air from flowing between the second side wall and the filter.

The base may include a first holding portion located between the filter and the first side wall and a second holding portion between the filter and the second side wall to hold the filter.

Portions of the first and second holding portions may surround corresponding first and second ends of the filter.

The holding portions may have a height less than the filter.

The blocking projection may extend from an upper surface of the second holding portion to the cover.

The blocking projection may extend between the first and second side walls.

The blocking projection may include a first side adjacent to the filter and a second side opposite the first side and facing the corner, and a gap may exist between the second side and the corner.

The filter may have a convex shape with respect to the corner, and the blocking projection may include a first upper portion spaced a predetermined distance from a lower surface of the base, contacting the cover, and tangentially contacting the filter; and a second portion extending contiguously between the second side wall and the filter, between the filter and the first upper portion, and between the base and the cover.

The filter may extend from the base to contact the cover.

The blocking projection may extend from the base to the cover between the filter and the second side wall.

The blocking projection may include a first side facing the filter and a second side facing the corner, each of the first and second sides having a first end closest to the first side wall and a second end adjacent to the second side wall, the filter may include a first end facing the first side wall and a second end facing the second side wall, and a length of a portion of the first side of the blocking projection between the second end of the filter and the first end of the first side of the blocking projection may be less than a distance between the second end of the filter and the first end of the second side of the blocking projection.

A cross-section of the filter as viewed from the cover may have one of a straight line segment shape, a convex shape, and a concave shape with respect to the corner.

The hard disk drive may also include a hard disk to store data, a head stack assembly including a head to read data from and write data to the hard disk, and a spindle motor to rotate the hard disk. Rotating the hard disk may cause the hard disk to generate the air to flow toward the corner between the first side wall and the filter.

Additional features and/or utilities of the present general inventive concept may be realized by a hard disk drive including a base, first and second side walls extending perpendicularly from the base to form a corner with the base and each other, a cover to contact the first and second side walls and to enclose the hard disk drive, and a filter positioned on the base to allow air to flow around the filter toward the corner between the first side wall and the filter and to prevent air from flowing around the filter between the second side wall and the filter.

The filter may directly contact the second side wall.

Additional features and/or utilities of the present general inventive concept may be realized by a computing device including a hard disk drive and a controller. The hard disk drive may include a base, first and second side walls extending perpendicularly from the base to form a corner with the base and each other, a cover to contact the first and second side walls and to enclose the hard disk drive, a filter positioned on the base to allow air to flow toward the corner between the first side wall and the filter, a blocking projection to prevent air from flowing between the second side wall and the filter, and a hard disk, rotatable around a spindle motor, to cause the air to flow toward the corner between the first side wall and the filter. The controller may access the hard disk drive to perform a read operation from and a write operation to the hard disk drive.

BRIEF DESCRIPTION OF THE DRAWINGS

The above and/or other aspects of the present general inventive concept will become apparent and more readily appreciated from the following description of the exemplary embodiments, taken in conjunction with the accompanying drawings, in which:

Exemplary embodiments of the general inventive concept will be more clearly understood from the following detailed description taken in conjunction with the accompanying drawings in which:

FIG. 3A is an enlarged perspective view of a filter area of FIG. 1;

FIG. 4 is an enlarged perspective view of a filter area in an HDD according to another exemplary embodiment of the present general inventive concept;

FIG. 5 is an enlarged perspective view of a filter area in an HDD according to another exemplary embodiment of the present general inventive concept;

FIGS. 8A-8F illustrate side plan views of the filter;

DETAILED DESCRIPTION OF THE EMBODIMENTS

Figure 1:
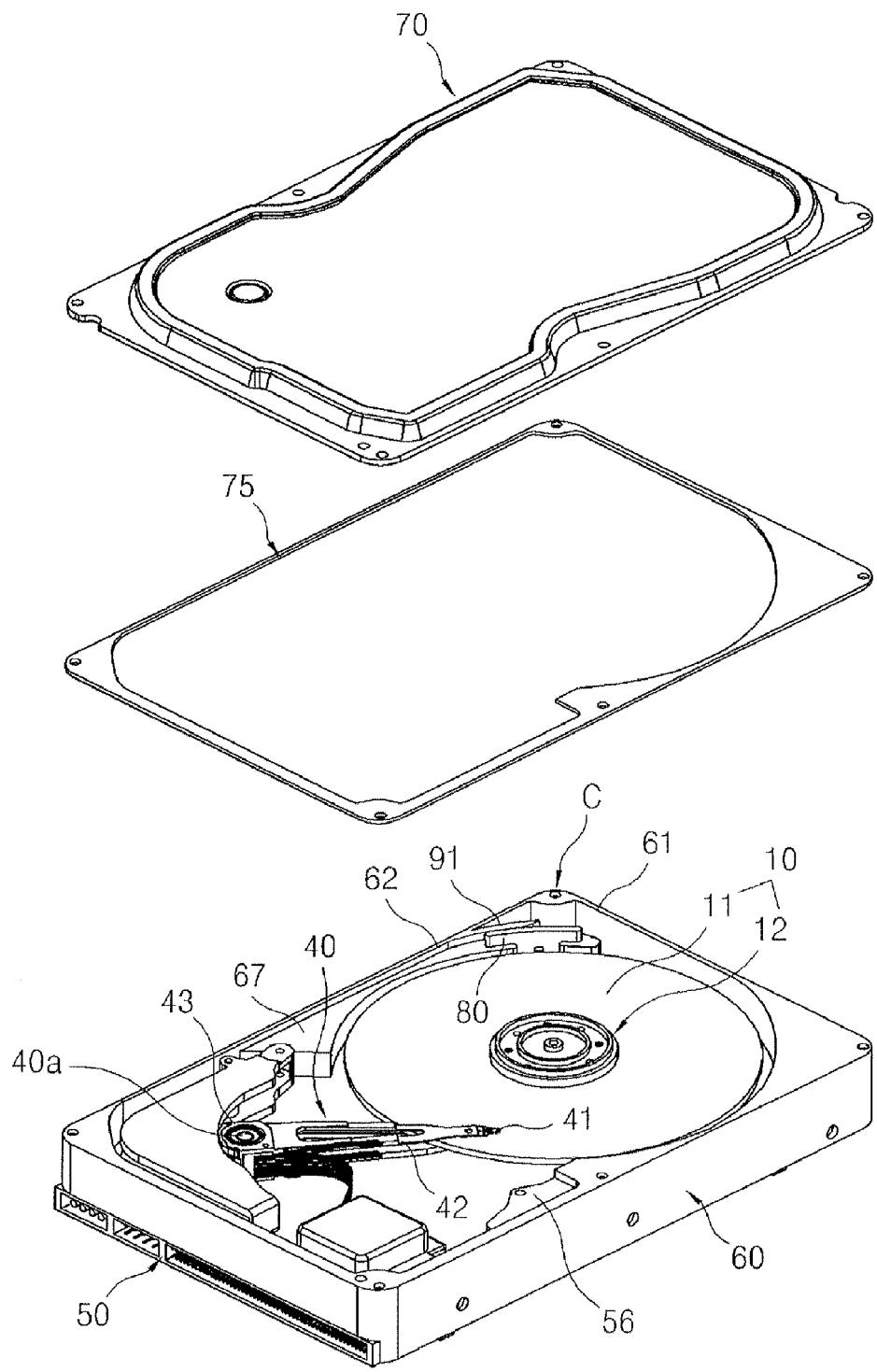
FIG. 1 is a partially exploded perspective view of an HDD according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Figure 2:
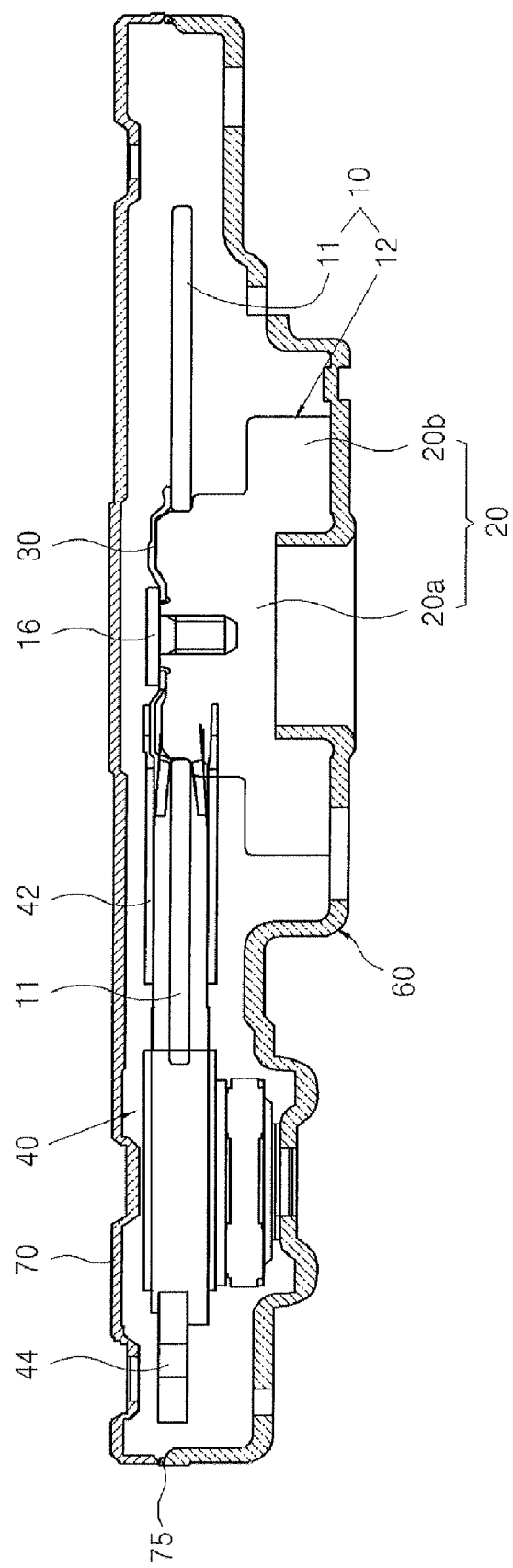
FIG. 2 is a cross sectional view of the HDD of FIG. 1.

FIG. 1 is a partially exploded perspective view of a hard disk drive according to an exemplary embodiment of the present general inventive concept. FIG. 2 is a cross sectional view of the HDD of FIG. 1. FIG. 3A is an enlarged perspective view of a filter area of FIG. 1.

Referring to FIGS. 1, 2, and 3A, the HDD according to an exemplary embodiment includes a disk pack 10 having a disk 11 to record and storing data and a spindle motor 12 to support and rotate the disk 11, a head stack assembly (HSA) 40 to read out data from the disk 11, a base 60 on which these constituent elements are assembled, a printed circuit board assembly (PCBA) 50 coupled to the lower portion of the base 60 and including a printed circuit board (PCB) with circuit parts corresponding to the functions of the hard disk drive, a cover 70 to cover the upper portion of the base 60, and a gasket 75 between the base 60 and the cover 70 to seal the hard disk drive.

While FIGS. 1, 2, and 3A illustrate a single disk 11, any number of disks 11 may be used. The disk 11 may have a compact size having a diameter of 2.5 inches or less, or any other desired size.

The disk 11 may have a recording surface on both of upper and lower surfaces thereof. Accordingly, a pair of magnetic heads 41 of the HSA 40 may be provided on both of upper and lower surfaces of the disk 11 to read or write data. The recording surface of the disk 11 may be divided into an outer diameter, a middle diameter, and an inner diameter, for example.

The spindle motor 12 of the disk pack 10 includes a spindle motor hub 20 to support the disk 11, a clamp 30 coupled to the upper portion of the spindle motor hub 20, and a clamp screw 16 pressing the clamp 30 to allow the disk 11 to be fixed to the spindle motor hub 20.

The spindle motor hub 20 includes a hub body 20a having an outer surface to which the disk 11 is fixed and an outer wing portion 20b outwardly extending further from a lower area of the hub body 20a in a radial direction. The disk 11 is fixed and supported on the upper area of the hub body 20a.

The head stack assembly 40 includes a magnetic head 41 to record data on the disk 11 or read the recorded data, an actuator arm 42 to pivot around a pivot shaft 40a across the disk 11 so that the magnetic head 41 may access data on the disk 11, a pivot shaft holder 43 to support the pivot shaft 40a to be capable of rotating and supporting the actuator arm 42 that is coupled thereto, and a bobbin (not shown), around which a voice coil 44 is wound, provided at the opposite position to the actuator arm 42 with respect to the pivot shaft holder 43 and located between magnets of a voice coil motor (not shown).

The voice coil motor is a type of a drive motor that pivots the actuator arm 42 to move the magnetic head 41 to a desired position on the disk 11 according to the Fleming's Left Hand rule. That is, a force is generated when current is applied to a conductive body existing in a magnetic field. As current is applied to the voice coil 44 existing between the magnets, a force is applied to the bobbin to pivot the bobbin. Accordingly, as the actuator arm 42 extending from the pivot shaft holder 43 in the opposite direction to the bobbin pivots, the magnetic head 41 supported at the end portion of the actuator arm 42 is moved across the disk 11 that is rotating. Thus, the magnetic head 41 searches tracks to access desired information or to record information onto the disk 11.

Although it is not illustrated in detail, an end tab (not shown) may be formed to extend from the end of the head stack assembly 40 adjacent to the magnetic head 41. The end of the head stack assembly 40 supports a slider (not shown) on which the magnetic head 41 is mounted to be elastically biased toward the surface of the disk 11. When power is off and the disk 11 is not rotating, the end tab may be parked on a ramp 56 to prevent the magnetic head from contacting the surface of the disk 11. Parking the end tab on the ramp 56 is referred to as a ramp loading method.

As illustrated in FIGS. 1 and 3A, a filter 80 is provided in an area between the outer edge of the disk 11 and a corner C of the base 60. The filter 80 collects contaminant particles in air flowing due to the rotation of the disk 11. Preventing the particles from returning to the hard disk improves reliability of recording data onto the disk 11 and reading the recorded data from the disk.

In the related art, even if a hard disk drive is provided with a filter, contaminants may still return to the hard disk 11 since no device or structure is provided to prevent the contaminants from moving around the filter.

According to the present exemplary embodiment, the filter 80 is provided in an area adjacent to the corner C at a side of the base 60 that is opposite the head stack assembly 40. The filter 80 is separated a predetermined distance from the corner C of the base 60. Thus, an air flow space or cavity F is formed between the filter 80 and the corner C of the base 60.

One side of the filter 80 is inserted in a filter holder 65 provided on the base 60 at a position close to the disk 11 and the other side of the filter 80 is inserted in an additional rib portion 66 on the base 60. The rib 66 may extend from a support 67 that may continue past the filter area of the hard disk drive to surround a portion of the hard disk 11. The support 67 may provide structural support to the rib 66 and/or the side wall 62, and may also act as a guide to air flow over the disk 11. The filter 80 may be manufactured of a synthetic textile material such as a piece of fabric. The filter 80 may have a height higher than the filter holder 65 and the additional rib portion 66.

When the cover 70 is coupled to the base 60, the inner surface of the cover 70 may press against the filter 80 to secure the filter 80 in place and to prevent contaminants from flowing over or under the filter.

For convenience of explanation, referring to FIG. 3A, the arrows represent a flow of air into the cavity F through an inlet portion and out through the filter 80. The side wall of the base that is adjacent to the inlet portion is defined as a first side wall 61 and the side wall of the base 60 on an opposite side of the filter 80 from the first side wall 61 is defined as a second side wall 62. The first and second side walls 61, 62 may be formed integrally or simultaneously with the base 60, or they may be formed separately and fixed to the base 60.

An air exhaust prevention unit 91, or a blocking projection, may be provided on at least one side of the filter 80 to increase the contaminant particle collection efficiency of the filter 80. The air exhaust prevention unit 91 may be located adjacent to the filter 80 to prevent the air from being exiting from the cavity F via a space between the second corner side wall 62 and the filter 80. As a result, air that flows into the cavity F via the inlet portion between the filter 80 and the first side wall 61 may exit the cavity F only via the filter 80.

The air exhaust support unit 91 may include a side surface rib 91 extending in the lengthwise direction of the filter 80 from the second corner side wall 62. The side surface rib 91 may be integrally manufactured with the base 60 or may be attached to the base. Alternatively, the side surface rib 91 may be formed on or attached to the gasket 75 or the cover 70.

When the side surface rib or blocking projection 91 is integrally provided with the base 60 as in the present exemplary embodiment, the side surface rib 91 is provided at the base 60 such that the upper surface of the side surface rib 91 may contact the inner surface of the cover 70. Accordingly, the air that flows into the air flow space F through the inlet portion may be prevented being exhausted through an outlet portion between the filter and the second side wall 62 without passing through the filter 80.

When the side surface rib 91 prevents the air that flows into the cavity F from being exhausted in a large amount through an outlet portion, the flow of air is guided such that the flow of air into the cavity F via the inlet portion of the filter 80 may be increased. Thus, a larger amount of air may pass through the filter 80 compared to the related art so that the contaminant particle reduction may be improved.

A guide inclined surface 91a to guide the air may be further formed at a leading end portion of the side surface rib 91. The guide inclined surface 91a is provided to guide the air toward the filter 80 by increasing a contact area with the air or guide the air flow such that the amount of air at the inlet portion of the filter 80 may be increased compared to the related art. Alternatively, the guide inclined surface 91a may not be provided.

Figure 3B:
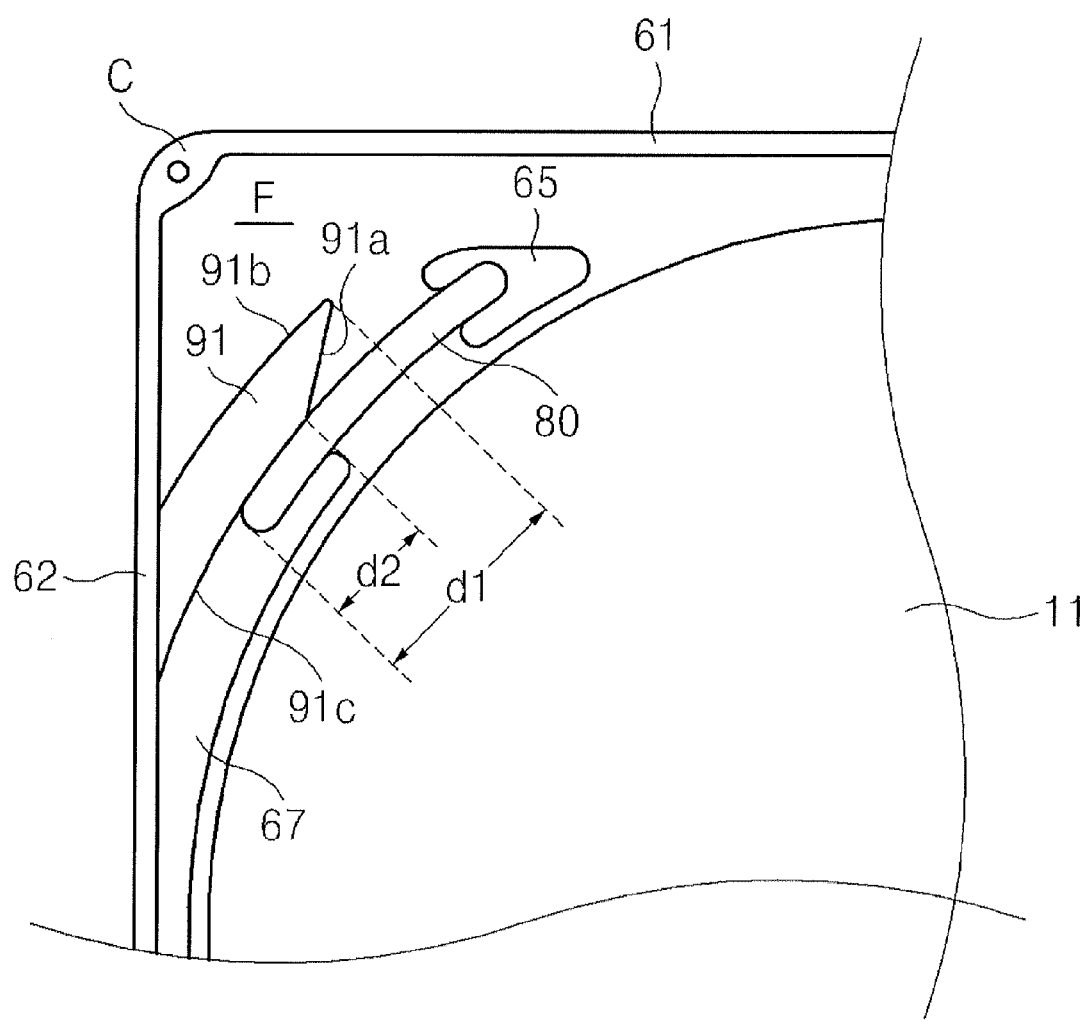
FIG. 3B is a plan view of the filter area of FIG. 1.

FIG. 3B illustrates a plan view of the corner C portion of the hard disk drive. The blocking projection 91 includes the inclined surface 91a, a first side 91b facing the corner, and a second side 91b opposite the first side and facing the filter 80. A first imaginary line extending from the end of the filter 80 closest to the second side wall 62 may be substantially perpendicular to second and third imaginary lines on each of the first and second sides 91b, 91c, the second and third imaginary lines being either substantially tangential to or co-linear with a point on the first and second sides 91b, 91c, respectively. When the guide inclined surface 91a is provided on the blocking projection 91, a length d1 of the first side surface 91b of the blocking projection 91 between the first imaginary line and the end of the first side surface 91b may be greater than a length d2 of the second side surface 91c between the first imaginary line and the end of the second side surface 91c. In other words, the inclined surface 91a is inclined in a direction toward the second side wall 62 in a direction from the corner C toward the disk 11.

During operation of the HDD, when power is applied to the HDD and current is supplied to the voice coil 44, the actuator arm 42 pivots around the pivot shaft 40a. Accordingly, the magnetic head 41 moves by floating over the surface of the disk 11 and reads and writes data from and onto the disk 11. As the disk 11 rotates, it generates an air flow.

The air flow has momentum in a direction tangential to the circumference of the disk 11. The air flow generated by rotation of the disk enters the air flow space, or cavity, F through the input portion between the filter 80 and the first corner side wall 61. The flow of air is prevented by the air exhaust prevention unit, or blocking projection, 91 from exiting the air flow space F via an outlet portion between the filter and the second side wall 62. This configuration may allow a greater air flow into the cavity F than configurations without the blocking projection 91, and thus a larger amount of air may pass through the filter 80 compared to the related art so that the contaminant particle reduction effect may be improved.

When the power to the HDD is cut off and the rotation of the disk 11 is stopped, the VCM rotates the actuator arm 42 around the pivot shaft 40a until the end tab located on the end of the actuator arm 42 is positioned on the ramp 56 so that the magnetic head 41 may be completely parked. Thus, according to the present general inventive concept, the HDD may be manufactured in a simple method without changing the material of the filter 80 and an improved contaminant particle collection effect may be expected.

When the hard disk drive includes a blocking projection 91 adjacent to the filter 80, the amount of air at the inlet portion increases so that the pressure at the inlet portion may be also increase. Accordingly, the blocking projection 91 may generate a large drop in air pressure between the air in the air flow space F and the air over the disk 11. With the greater drop in air pressure, the flow of air from the air flow space F through the filter 80 increases, thereby increasing the amount of air that may be processed by the filter 80 over a predetermined period of time.

Table 1 below shows a result of a particle clean up (PCU) time test that is experimentally verified according to the International Disk Drive Equipment and Materials Association (IDEMA) standard using a hard disk drive including the blocking projection 91 adjacent to a filter 80 according to the present exemplary embodiment.

TABLE 1

|  | Related Art | First Exemplary Embodiment |
| --- | --- | --- |
| Drive level PCU (s) | 14.4 | 13.4 |
| Filter level PCU (s) | 30.3 | 25.7 |
| Flow rate (cc/s) | 2.0 | 2.4 |

In Table 1, it can be seen that a flow increase effect by about 20% is generated compared to the related art and that the PCU time ($t_{90}$) decreases by 4.6 seconds and 1.0 second, respectively, at the filter level and the drive level.

FIG. 4 is an enlarged perspective view of a filter area in a hard disk drive according to another exemplary embodiment of the present general inventive concept. Referring to FIG. 4, an air exhaust prevention unit, or blocking projection, 92 is an upper surface rib 92 separated from a bottom of the base 60 toward the cover 70 and has both ends connected to the first and second corner side walls 61 and 62.

The upper surface rib 92 may be integrally manufactured with any one of the base 60, the cover 70, and the gasket 75, or may be separately manufactured and assembled at an appropriate position. When the upper surface rib 92 is integrally provided with the base 60 as illustrated in FIG. 4, the upper surface of the upper surface rib 92 may contact the inner surface of the cover 70 during the assembly of the base 60 and the cover 70 as in the above-described exemplary embodiment. As a result, the upper surface rib 92 may prevent air from exiting the cavity F via an outlet portion between the filter 80 and the second side wall 62.

When the upper surface rib 92 is provided as the air exhaust prevention unit or blocking projection 92, air flows into the air flow space F via the inlet portion, as indicated by the arrows in FIG. 4. The air is prevented by the upper surface rib 92 from flowing out of the air flow space F via an outlet portion between the filter 80 and the second wall 62, and the air is guided toward the filter 80. Thus, providing the upper surface rib 92 causes a larger amount of air to pass through the filter 80 compared to the related art, and the contaminant particle reduction effect may be improved.

In the present exemplary embodiment, an aperture 92a is provided between the upper surface rib 92 and the corner C of the base 60. The aperture 92a may cause the air flow in the air flow space F to be smooth by creating a section of stationary air. Alternatively, the aperture 92a may be omitted, and the upper surface rib 92 may extend from the filter 80 to the corner C.

Table 2 below shows a result of a PCU time test that is experimentally verified according to IDEMA standard using a hard disk drive including a filter area with the upper surface rib 92 according to the present exemplary embodiment.

TABLE 2

|  | Related Art | First Exemplary Embodiment |
| --- | --- | --- |
| Drive level PCU (s) | 14.4 | 12.8 |
| Filter level PCU (s) | 30.3 | 21.8 |
| Flow rate (cc/s) | 2.0 | 2.8 |

In Table 2, it can be seen that a flow increase effect of about 40% occurred compared to the related art and that the PCU time ($t_{90}$) decreases by 8.5 seconds and 1.6 seconds, respectively, at the filter level and the drive level.

FIG. 5 is an enlarged perspective view of a filter area in a hard disk drive according to another exemplary embodiment of the present general inventive concept. In the present exemplary embodiment, the technical features of the above two exemplary embodiments are applied. That is, in the present exemplary embodiment, the side surface rib 91 of FIG. 3 and the upper surface rib 92 of FIG. 4 are both provided to prevent air from exiting the cavity F via an outlet portion between the end of the filter 80 and the second side wall 62.

According to the present exemplary embodiment, the hard disk drive may be manufactured in a simple method without changing the material of the filter 80 and an improved contaminant particle collection effect may be expected.

Figure 6:
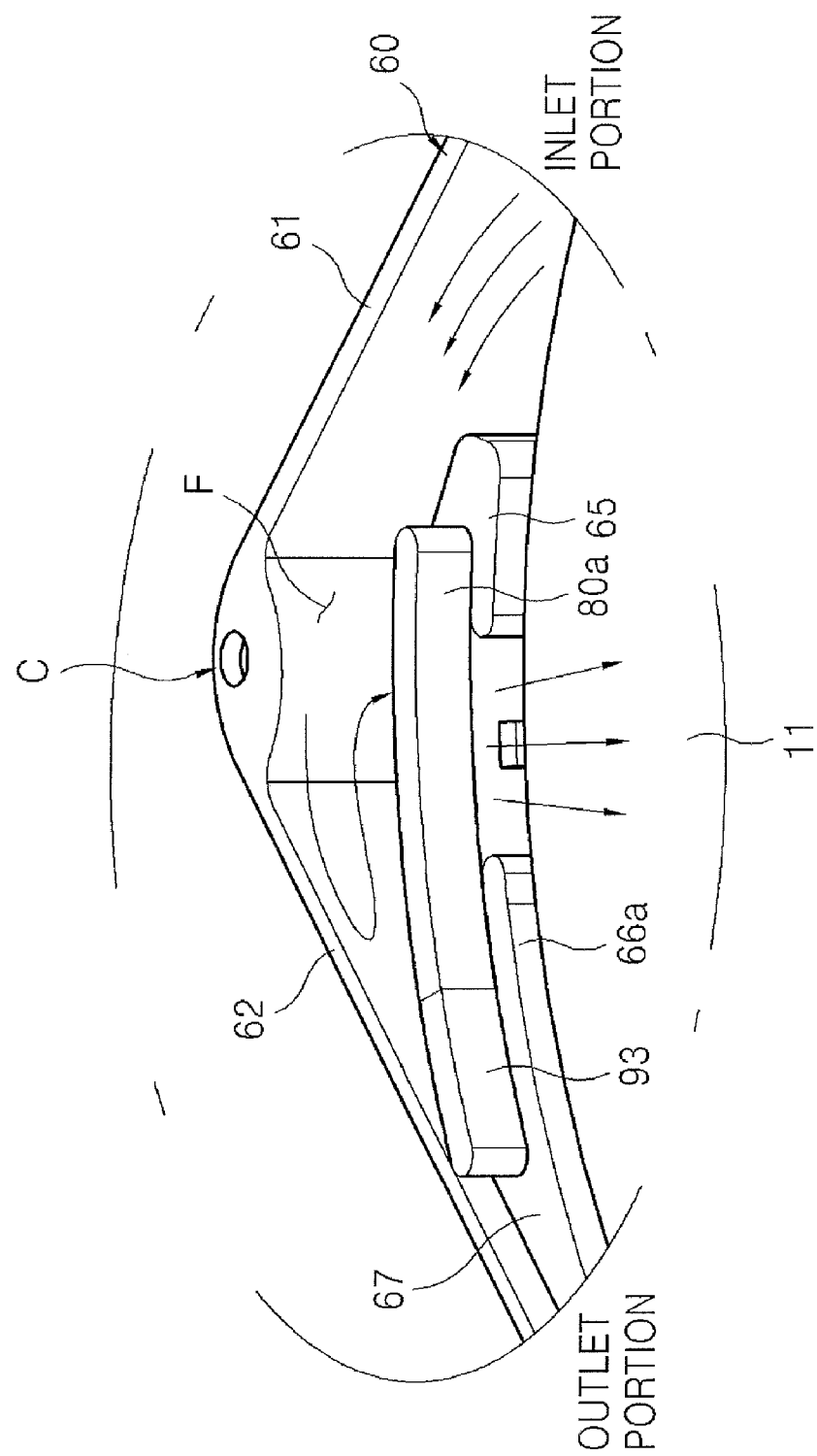
FIG. 6 is an enlarged perspective view of a filter area in an HDD according to another exemplary embodiment of the present general inventive concept.

FIG. 6 is an enlarged perspective view of a filter area in an HDD according to another exemplary embodiment of the present general inventive concept. In the present exemplary embodiment, an air exhaust prevention unit 93 is provided as an extended portion 93 of a filter 80a.

The upper surface of the extended portion 93 of the filter 80a contacts the inner surface of the cover 70 to prevent air from flowing around the filter 80a and out of the cavity F. The extended portion 93 of the filter 80a extends in a manner that one end portion thereof is inserted in the filter holder 65 and the other end portion thereof contacts the second corner side wall 62.

An extended rib portion 66a may be provided adjacent to the second corner side wall 62 to receive an end of the extended filter 80a. Thus, the filter 80a having the extended portion 93 may be positioned to improve contaminant particle collection.

Figure 7A:
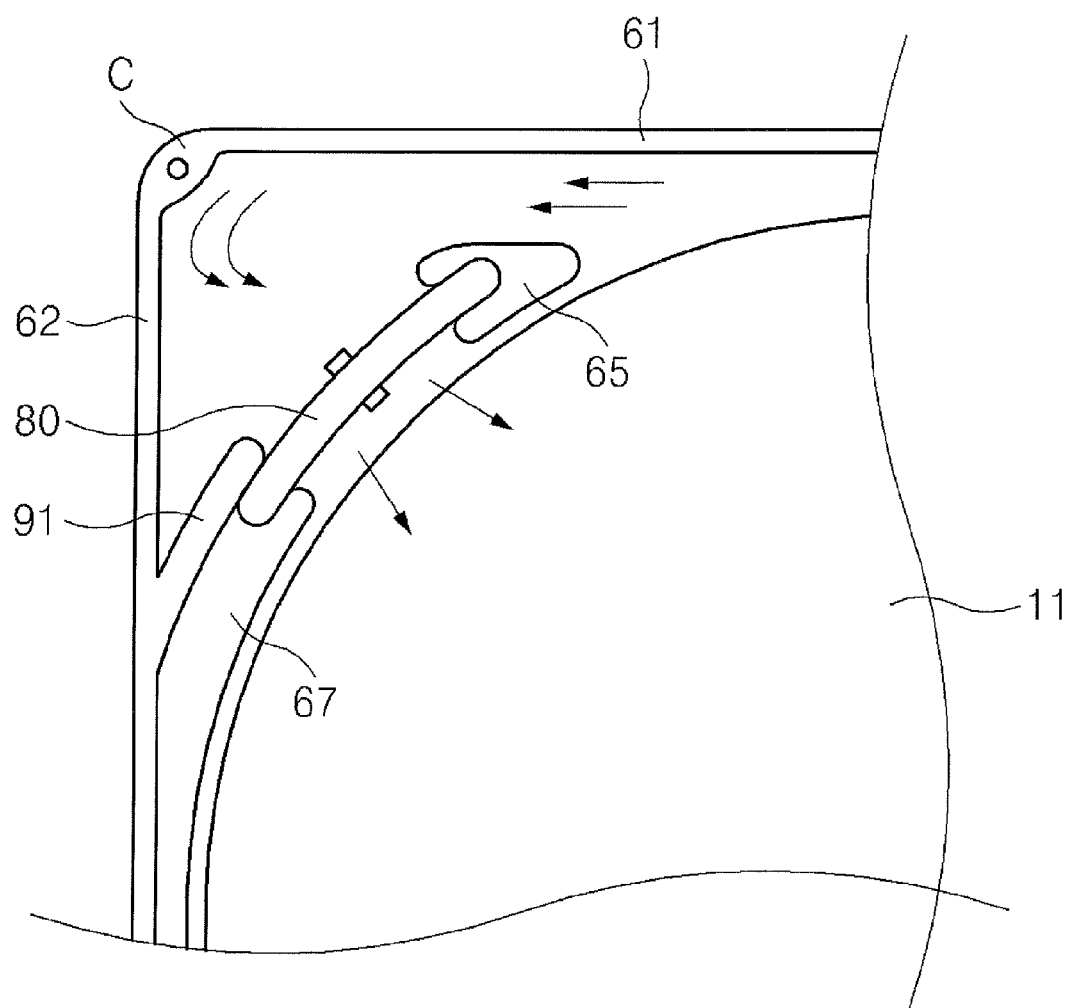
FIGS. 7A-7D illustrate filters of varying shapes.
Figure 7B:
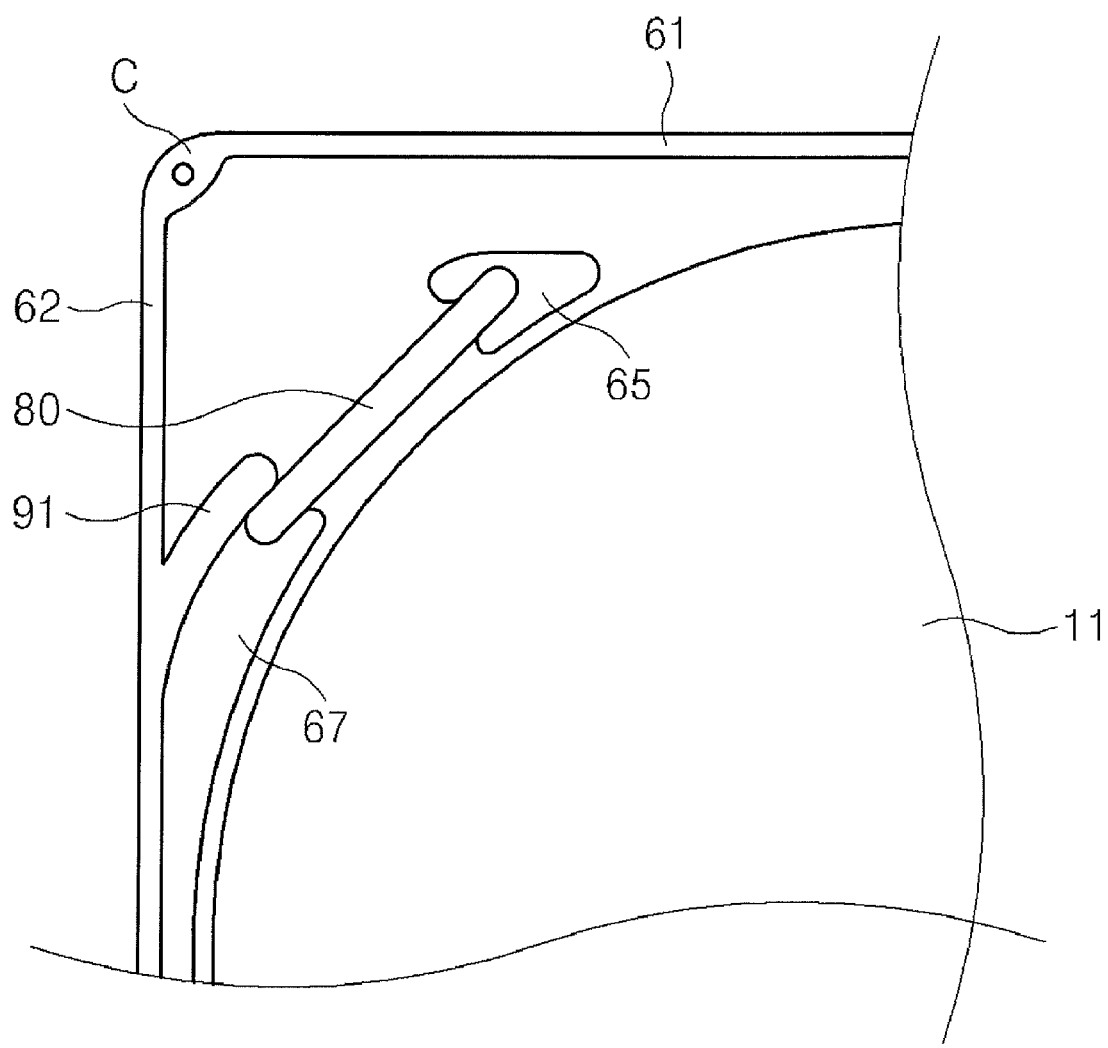
Figure 7C:
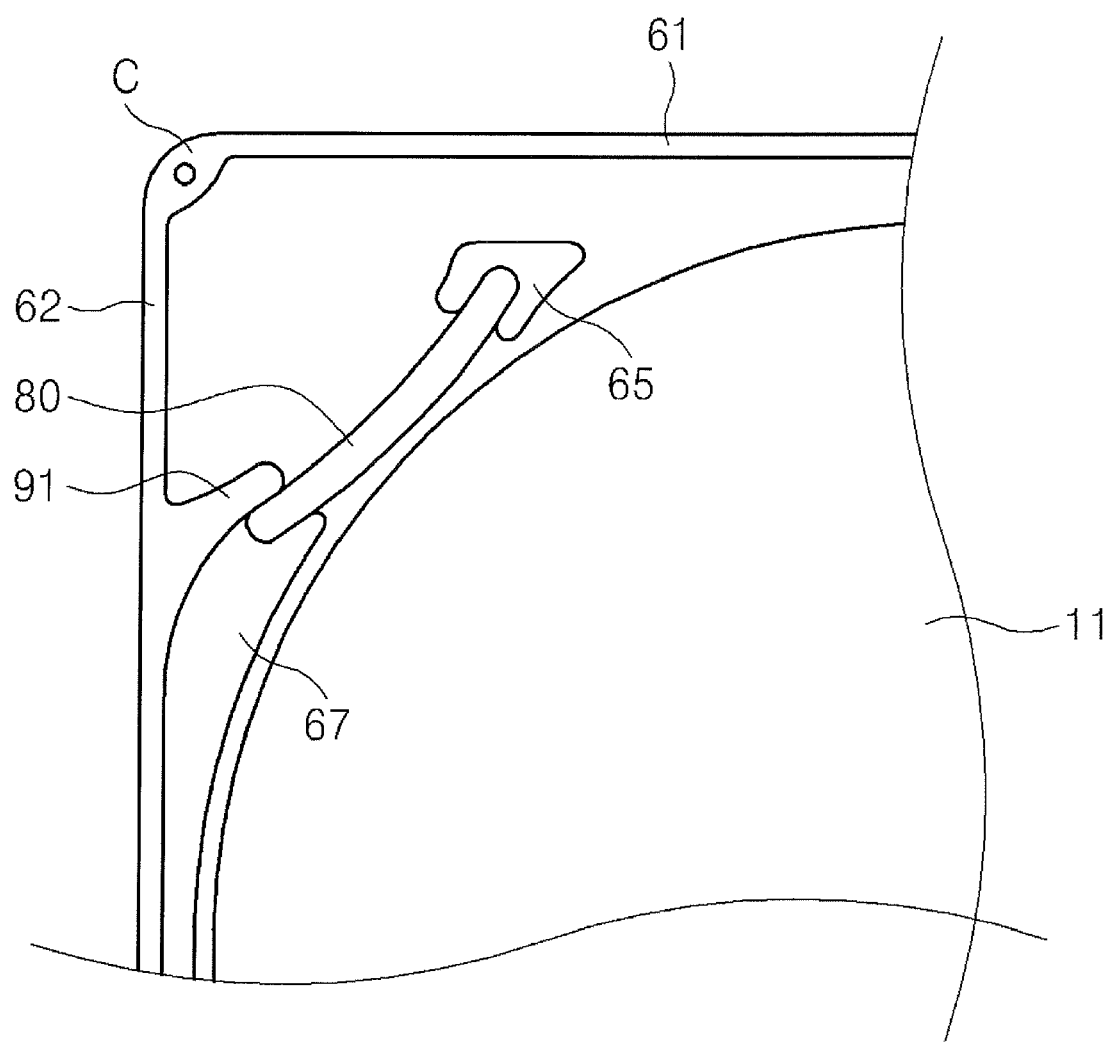
Figure 7D:
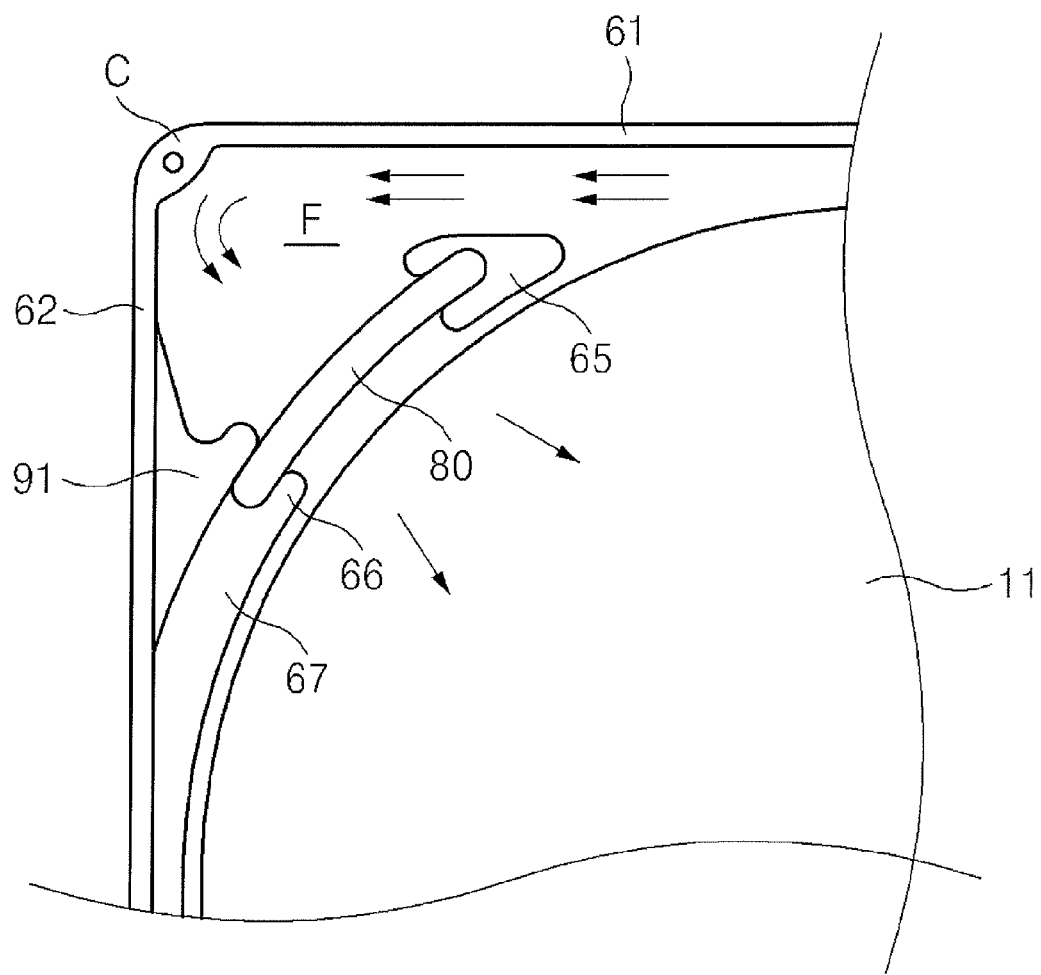

FIGS. 7A-7D illustrate filters 80 and blocking projections 91 having varying shapes. FIG. 7A illustrates a filter 80 that has a convex shape with respect to the corner C. The blocking projection 91 may similarly have a convex shape. FIG. 7B illustrates a filter 80 and blocking projection 91 having substantially linear shapes. FIG. 7C illustrates a filter 80 and blocking projection 91 having concave shapes with respect to the corner C. FIG. 7D illustrates a filter 80 having the convex shape of FIG. 7A, but the blocking projection 91 has a concave shape between the second side wall 62 and the filter 80 to guide air flow. Although FIGS. 7A-7D refer to blocking projection 91, an upper surface rib blocking projection 92 may also have the same configurations as the blocking projections 91 illustrated in FIGS. 7A-7D. For example, if an upper surface rib 92 is used in FIG. 7D, a space may exist between the upper surface rib 92 and a bottom side 63 of the base 60.

FIGS. 8A-8F illustrate side views of the filter and blocking projections 91, 92 as viewed from the corner C. In FIG. 8A, the blocking projection 91 is a rib that extends upward from a rear rib 66b of the base 60. The rear rib 66b may be a projection from the support 67 on a side facing the corner C that corresponds to the rib 66 that projects from the support 67 on a side facing the disk 11. The filter 80 is secured by the filter holder 65, the rib 66, the rear rib 66b, and the cover 70. A portion of the filter 80 may be covered by the blocking projection 91 or the blocking projection 91 may contact only a side of the filter 80. Dashed lines indicate the portion of the filter 80 covered by the blocking projection 91.

FIG. 8B illustrates a blocking projection 91 that is integral with the cover 70 and extends downward to contact the support 67 and the rear rib 66b. Dashed lines in the blocking projection 91 indicate the portion of the filter 80 covered by the blocking projection 91. Although FIGS. 8A and 8B omit the gasket 75, the gasket 75 may be located between the cover and the base 60.

FIG. 8C illustrates a blocking projection 91 that is integral with the gasket 75 and extends downward to contact the support 67 and the rear rib 66b, and extends upward to contact the cover 70.

FIG. 8D illustrates a blocking projection 91 that is located adjacent to the filter 80 between the support 67 and the cavity F. Dashed lines in the blocking projection 91 indicate a surface of the support 67 and the rib 66 on a side facing the disk 11. Although FIG. 8D illustrates a portion of the base 60 as the blocking projection 91 extending from the bottom side 63 to the cover 70, the blocking projection 91 may also be part of the cover 70, a gasket 75 between the cover 70 and the base 60, or a component that is attached to the base 60 after the base 60 is formed.

FIG. 8E illustrates a filter area having a blocking projection 92 that is an upper surface rib. The blocking projection 92 extends from the second side wall 62 to the first side wall 61. The dashed lines in the blocking projection 92 indicate the portion of the filter 80 covered by the blocking projection 92 and the shape of the cover 70 on the disk 11 side of the filter 80 opposite the corner C side of the filter 80. The blocking projection 92 may be part of the cover 70, as illustrated in FIG. 8E, or it may be part of a gasket 75, the base 60, or attached to the cover 70, gasket 75, or base 60 after the cover 70, gasket 75, and base 60 are respectively formed.

FIG. 8F illustrates a filter area having a blocking projection 92 that is an upper surface rib. The blocking projection 92 extends from the second side wall 62 to cover a portion of the filter 80. In FIG. 8B, no rear rib 66b extends from the support 67. The upper surface rib 92 may extend to a height of the upper surface of the support 67 and the rib 66, or it may extend below the upper surface of the support 67 and the rib 66. Dashed lines in the upper surface rib 92 illustrate a portion of the filter covered by the upper surface rib 92. Dashed lines in the filter 80 correspond to the location of the rib 66 on the side of the filter 80 facing the disk 11.

Figure 9:
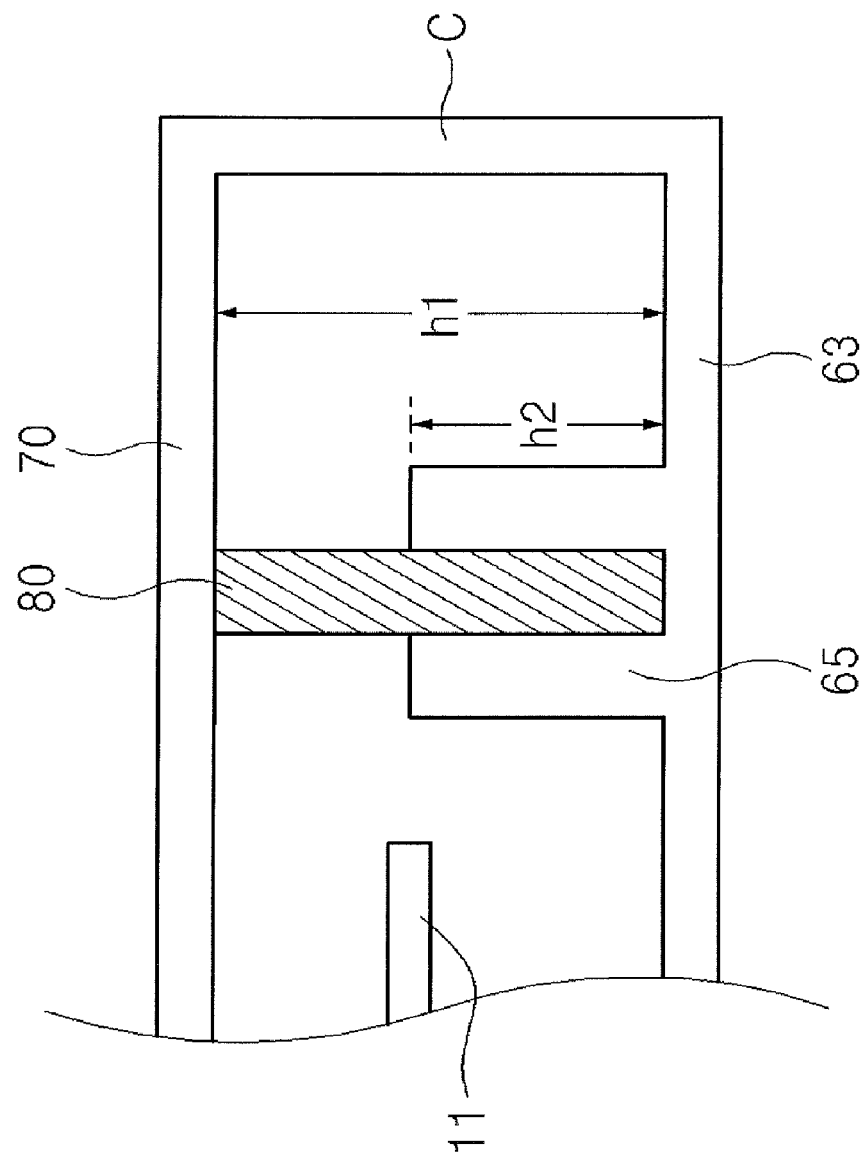
FIG. 9 illustrates another side plan view of the filter.

FIG. 9 illustrates a side plan view of the filter 80 and filter holder 65 as seen from the first side wall 61. As illustrated in FIG. 9, the filter 80 may extend from a bottom side 63 of the base 60 to contact the cover 70. In addition, a height h1 of the filter 80 may be greater than a height h2 of the filter holder 65, and the rib 66.

Figure 10:
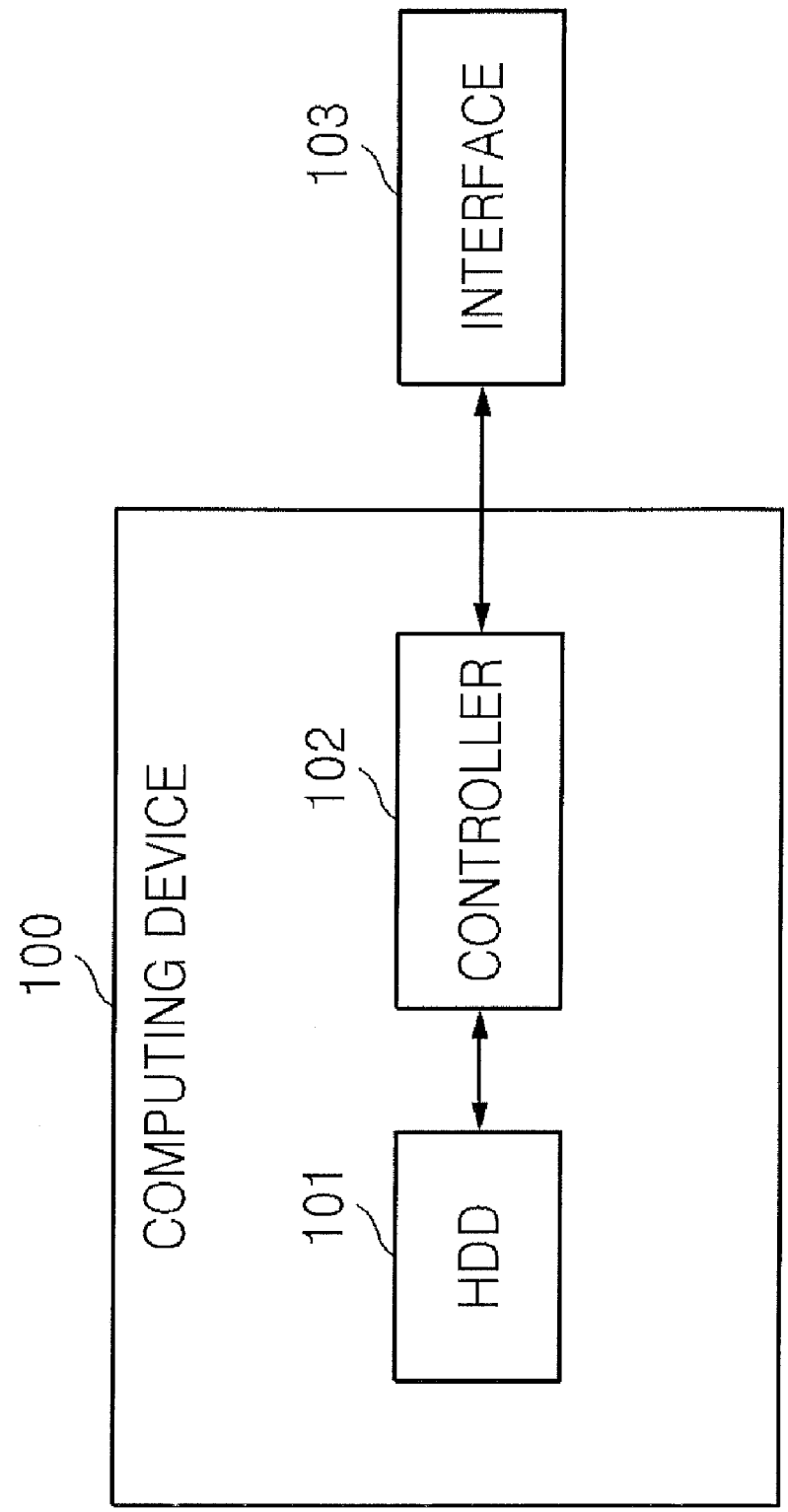
FIG. 10 illustrates a computing device including a hard disk drive.

FIG. 10 is a block diagram illustrating a structure of a computing device 100 including a hard disk drive 101 according to the present general inventive concept. The computing device 100 may include the hard disk drive 101 and a controller 102 to control operations to read to or write from the hard disk drive 101. The controller 102 may be in communication with an interface 103 either in the computing device 100 or external to the computing device 100. The interface may be a user keyboard or keypad or it may include electrical terminals or a wireless transceiver to communicate with an external electrical device. The controller may include a processor and memory, such as RAM, for example.

Although in the above-described embodiments the HDD is provided with a single disk 11, the concept of the present general inventive concept may be applied to a hard disk drive having two or more disks 11.

As described above, according to the present general inventive concept, a hard disk drive may be manufactured in a simple method without changing the media of a filter and a contaminant particle collection effect may be improved.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A hard disk drive comprising:
a base on which at least one disk to record data is provided, the base having a corner defined by a juncture of a first side wall and a second side wall;
a filter positioned adjacent to the corner to collect contaminant particles with a first predetermined air flow space interposed between the corner and the filter and a second predetermined air flow space between the filter and the first side wall to allow air to flow around the filter toward the corner, the first side wall being upstream of the second side wall with respect to a direction of air flow within the hard disk drive; and an air exhaust prevention unit between the filter and the second side wall to prevent air from flowing between the filter and the second side wall.

2. The hard disk drive of claim 1, wherein the air exhaust prevention unit is a side surface rib that extends from the second side wall in a lengthwise direction of the filter.

3. The hard disk drive of claim 2, further comprising a cover,
wherein an upper surface of the side surface rib contacts an inner surface of the cover.

4. The hard disk drive of claim 2, wherein a guide inclined surface to guide air is formed at a leading end portion of the side surface rib.

5. The hard disk drive of claim 1, further comprising a cover, wherein:
the air exhaust prevention unit is an upper surface rib that is provided at a position separated from a bottom surface of the base with both ends of the air exhaust prevention unit connected to the first and second side walls, and
an upper surface of the upper surface rib contacts an inner surface of the cover.

6. The hard disk drive of claim 5, wherein an aperture is further formed between the upper surface rib and the corner of the base.

7. The hard disk drive of claim 1, further comprising a cover,
wherein the air exhaust prevention unit comprises:
a side surface rib extending from the second side wall in a lengthwise direction of the filter; and
an upper surface rib separated from a bottom of the base toward the cover with both ends of the air exhaust prevention unit connected to the first and second side walls, respectively.

8. The hard disk drive of claim 7, wherein the side surface rib is arranged between the filter and the upper surface rib.

9. The hard disk drive of claim 1, further comprising:
a cover; and
a filter holder coupled to the base and separated from the first side wall and in which the filter is partially inserted,
wherein the air exhaust prevention unit is an extended portion of the filter extending such that an upper surface of the air exhaust prevention unit contacts an inner surface of the cover, wherein
one end portion of the filter is inserted in the filter holder.

10. The hard disk drive of claim 1, further comprising:
a cover covering an upper portion of the base; and
a gasket contacting and forming a seal between the base and the cover,
wherein the air exhaust prevention unit extends from at least one of the base, the cover, and the gasket.

11. A hard disk drive, comprising:
a base;
first and second side walls extending perpendicularly from the base to form a corner with the base and each other, the first side wall being upstream of the second side wall with respect to a direction of air flow within the hard disk drive;
a cover to contact the first and second side walls and to enclose the hard disk drive; and
a filter positioned on the base to allow air to flow toward the corner between the first side wall and the filter,
wherein the filter is operable to collect contaminant particles with a first predetermined air flow space interposed between the corner and the filter, and
and wherein the filter is operable to collect contaminant particles with a second predetermined air flow space between the filter and the first side wall to allow air to flow around the filter toward the corner, wherein the first side wall is upstream of the second side wall with respect to a direction of air flow within the hard disk drive.

12. The hard disk drive according to claim 11, wherein the base includes a first holding portion located between the filter and the first side wall and a second holding portion between the filter and the second side wall to hold the filter.

13. The hard disk drive according to claim 12, wherein portions of the first and second holding portions surround corresponding first and second ends of the filter.

14. The hard disk drive according to claim 12, wherein the holding portions have a height less than the filter.

15. The hard disk drive according to claim 12 further comprising a blocking projection to prevent air from flowing between the second side wall and the filter, wherein the blocking projection extends from an upper surface of the second holding portion to the cover.

16. The hard disk drive according to claim 15, wherein the blocking projection extends between the first and second side walls.

17. The hard disk drive according to claim 16, wherein:
the blocking projection includes a first side adjacent to the filter and a second side opposite the first side and facing the corner, and
a gap exists between the second side and the corner.

18. The hard disk drive according to claim 12 further comprising a blocking projection to prevent air from flowing between the second side wall and the filter, wherein:
the filter has a convex shape with respect to the corner, and
the blocking projection includes:
a first upper portion spaced a predetermined distance from a lower surface of the base, contacting the cover, and tangentially contacting the filter; and
a second portion extending contiguously between the second side wall and the filter, between the filter and the first upper portion, and between the base and the cover.

19. The hard disk drive according to claim 11, wherein the filter extends from the base to contact the cover.

20. The hard disk drive according to claim 11 further comprising a blocking projection to prevent air from flowing between the second side wall and the filter, wherein the blocking projection extends from the base to the cover between the filter and the second side wall.

21. The hard disk drive according to claim 11 further comprising a blocking projection to prevent air from flowing between the second side wall and the filter, wherein:
the blocking projection includes a first side facing the filter and a second side facing the corner, each of the first and second sides having a first end closest to the first side wall and a second end adjacent to the second side wall,
the filter includes a first end facing the first side wall and a second end facing the second side wall, and
a length of a portion of the first side of the blocking projection between the second end of the filter and the first end of the first side of the blocking projection is greater than a distance between a portion of the second side of the blocking projection corresponding to the second end of the filter and the first end of the second side of the blocking projection.

22. The hard disk drive according to claim 11, wherein a cross-section of the filter as viewed from the cover has one of a straight line segment shape, a convex shape, and a concave shape with respect to the corner.

23. The hard disk drive according to claim 11, further comprising:
a hard disk to store data;

a head stack assembly including a head to read data from and write data to the hard disk; and a spindle motor to rotate the hard disk, wherein rotating the hard disk causes the hard disk to generate the air to flow toward the corner between the first side wall and the filter.

24. The hard disk drive according to claim 11 further comprising a blocking projection to prevent air from flowing between the second side wall and the filter, wherein:

the base includes a bottom side opposite the cover, and the blocking projection is separated from the bottom side of the base by a predetermined distance.

25. A hard disk drive, comprising:

a base;

first and second side walls extending perpendicularly from the base to form a corner with the base and each other, the first side wall being upstream of the second side wall with respect to a direction of air flow within the hard disk drive;

a cover to contact the first and second side walls and to enclose the hard disk drive; and a filter positioned on the base to allow air to flow around the filter toward the corner between the first side wall and the filter and to prevent air from flowing around the filter between the second side wall and the filter.

* * * * *